R. FARIES.
JAR AND DIPPER FOR SERVING CRUSHED FRUIT OR THE LIKE
APPLICATION FILED MAY 31, 1919.
Reissued July 8, 1919.
14,681.
2 SHEETS—SHEET 1.
*Fig. 1ª*
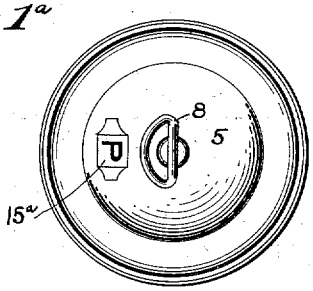
*Fig. 1.*
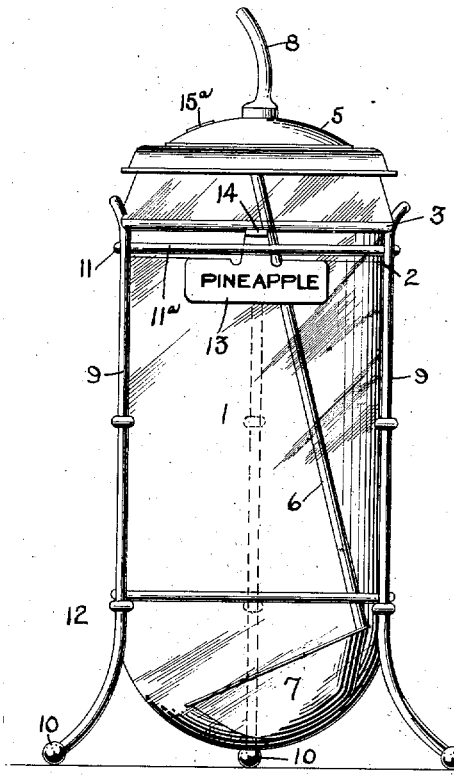
*Fig. 2.*
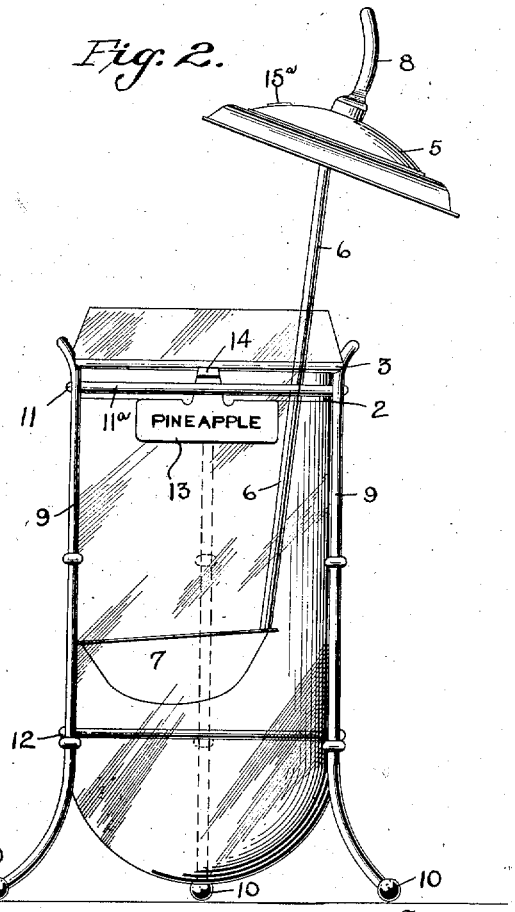
Witness
Inventor
*Robert Faries*
By *Dodson & Roe*
Attorney

R. FARIES.

JAR AND DIPPER FOR SERVING CRUSHED FRUIT OR THE LIKE.

APPLICATION FILED MAY 31, 1919.

Reissued July 8, 1919.

14,681.

2 SHEETS—SHEET 2.

Inventor

Robert Faries

Witness

Jno. Carter

By Dodson & Roe

Attorney

UNITED STATES PATENT OFFICE.

ROBERT FARIES, OF DECATUR, ILLINOIS, ASSIGNOR TO WALRUS MANUFACTURING COMPANY, OF DECATUR, ILLINOIS, A CORPORATION OF ILLINOIS.

JAR AND DIPPER FOR SERVING CRUSHED FRUIT OR THE LIKE.

14,681. Specification of Reissued Letters Patent. Reissued July 8, 1919.

Original No. 779,271, dated January 3, 1905, Serial No. 203,742, filed April 18, 1904. Application for reissue filed May 31, 1919. Serial No. 301,060.

*To all whom it may concern:*

Be it known that I, ROBERT FARIES, of the city of Decatur, in the county of Macon and State of Illinois, have invented a certain new and useful Jar and Dipper for Serving Crushed Fruit or the like, of which the following is a specification.

This invention is intended for use in beverage-dispensing outfits, commonly called "soda-fountains." It is exemplified in the structure hereinafter described, and it is defined in the appended claims.

One object of the invention is to provide a jar and dipper so shaped and proportioned that the dipping edge of the dipper may be presented downward to receive a filling of the contents of the jar and the dipper may be raised to an approximately horizontal position by placing the back of the dipper-rod against a side of the mouth of the jar.

Another object is to so arrange the cover with relation to the dipper that when the dipper is level inside the jar the cover will be to one side out of the range of view to the operation of lifting and tipping the dipper.

Another object is to have the handle by which the cover and the dipper are raised always outside the jar, so as not to be contaminated by the contents of the jar.

Another object is to so shape or mark the handle or the cover as to indicate the position of the dipping edge of the dipper from outside the jar.

Another object is to have the handle so formed and placed in relation to the dipper that when the handle is grasped in the natural way and in conformity to the markings that indicate the front edge of the dipper the dipper will be in proper position for raising and tipping.

Another object is to so shape the jar and the dipper that practically all the contents of the jar may be readily removed by the dipper.

In the drawings forming part of this specification,

Figure 1 is an elevation of an embodiment of my invention, showing the cover in place on the jar.

Fig. 1ª is a plan of the cover and a handle thereon.

Fig. 2 is an elevation showing the cover moved to one side of the mouth of the jar and the dipper partly raised out of the jar.

Figure 3:
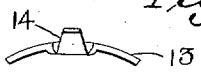
Fig. 3 is a plan of the label-plate.
Figure 4:
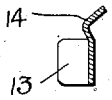
Fig. 4 is a section through the label-plate on the line X in Fig. 3.
Figure 5:
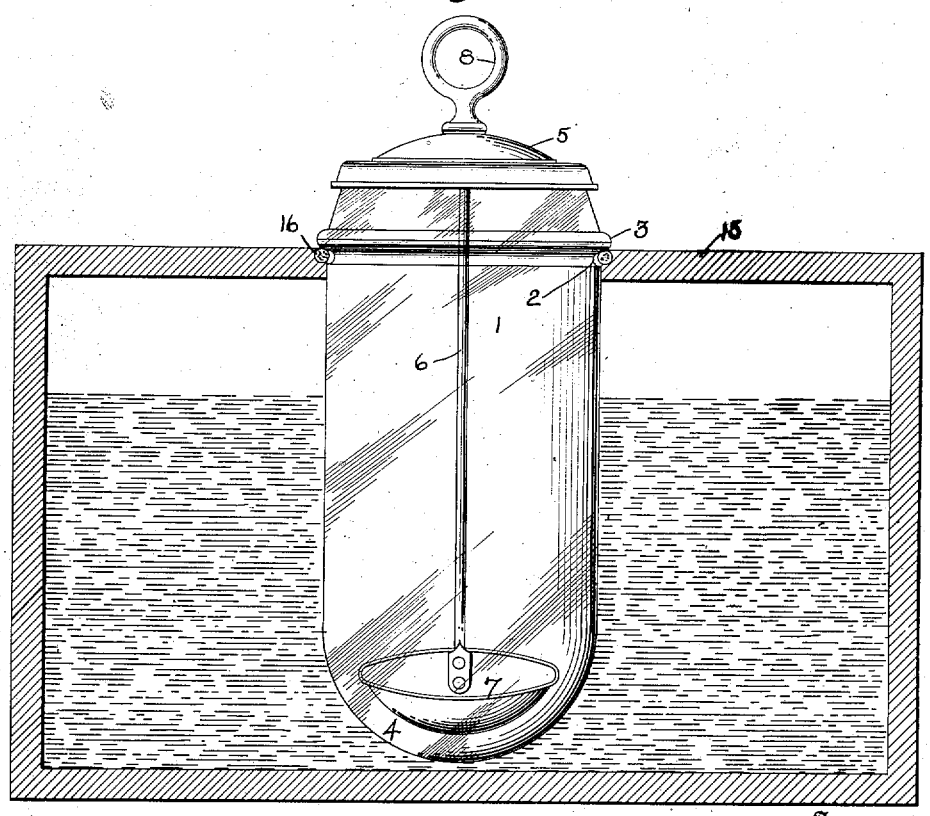
Fig. 5 shows the jar sustained in a receptacle containing cold water and illustrates a desirable use of the principal features of the invention.

The jar 1 is preferably made of glass with a hemispherical bottom 4, and it has an annular groove 2 near its upper end surmounted by an annular ledge 3. The cover 5 is adapted to close the mouth of the jar. A rod 6 extends downward from the under surface of the cover, and a dipper 7 is attached at one side to the lower end of rod 6. The cover and the dipper are so connected that when the cover is in place on the jar in an approximately horizontal position the dipper will occupy a space near one side of the lower end of the jar, with its dipping edge inclined downward and away from such side. The cover has a handle 8, shaped to aid in lifting the cover with the dipper in a dipping position, and in this instance the handle is also formed to indicate the dipping edge of the dipper. The handle preferably consists of a ring which is rigidly secured to the cover, which is curved flatwise, with its upper part inclined in the direction in which the dipper extends from rod 6 and which is practically a continuation of the dipper rod. The different parts of the dipping appliance and cover are secured together rigidly, and whenever the handle is grasped in a certain way, indicated by the band of the handle or by other forms or markings, the dipper is sure to be in proper position for raising and tipping.

When the jar is used on a counter, it is provided with a sustaining-frame composed of a set of vertical rods 9, which terminate in legs extending below the bottom of the jar, and rings 11 and 12 secured to rods 9 and encircling the jar. Ring 11 is cut or separated at 11ª, and it is sprung into groove 2 under ledge 3. The legs of the supporting frame are preferably provided with rubber balls 10 on their feet, so as not to scratch or mar the counter-top.

The label plate 13 has a lug 14 which is bent to conform to groove 2 of the jar and to the ring encircling such groove, and it is held in place removably by inserting the lug between the ring and the jar. In this instance the ring that holds the label plate in place is a part of the supporting frame; but it is obvious that the function of holding the label is independent of the function of supporting the jar and that the ring holding the label need not be a part of the supporting stand.

When used in direct connection with a soda fountain, the jar may be supported in a receptacle, as 15, containing cold water from the ice of the soda fountain, and in that case a gasket 16 may be used to take the weight of the jar through ledge 3 and form an air tight joint.

The concave bottom of the jar makes it possible for the dipper to get about all the contents of the jar without special manipulation, and when the cover is moved to the side of the jar opposite the dipping edge of the dipper the obliquity of rod 6 will permit the dipper to assume an approximately level position beneath the exposed part of the mouth of the jar as shown in Fig. 2.

While the jar is particularly applicable to the dispensing of crushed fruits and syrups, its utility is not necessarily confined to that purpose, and it may be used to serve any beverage or refreshment desired.

When the cover and dipper are manipulated by the dispenser alone, a flattened handle is a sufficient guide for him to locate the position of the dipping edge after having once used the dipper and replaced it; but when the jar is placed on the counter as will usually be the case when the jar is used as a substitute for the crushed fruit bowl, it will be accessible to the public, and meddlesome persons will be likely to move the cover from the position in which the dispenser left it. Under these circumstances some distinguishing mark will be necessary to locate the position of the dipping edge of the dipper, and the curved ring which constitutes the handle will meet that demand more or less completely. If desired, however, an additional mark or indicating characteristic may be placed on the cover above the dipping edge of the dipper, as shown at 15ª, in Figs. 1, 1ª and 2, and this mark may also aid the dispenser in determining the contents of the jar. In this case the label bears the word "Pineapple" and the auxiliary mark to indicate the location of the dipping edge of the dipper is a "P", and the initial of the name on the label may be similarly used in other cases.

The mouth of the jar is wide, the jar is wide in proportion to its length, the rod of the dipper inclines backward from the cover of the jar, and the dipping edge of the dipper inclines downward from the rod at an incline somewhat in excess of a right angle, all approximately as shown in the drawings, so that the contents of the jar may be readily dipped up and raised out of the jar without losing any material part of a dipperful.

By making the bottom of the jar concave and shaping the ladle to conform in a general way to the concave surface the entire contents of the jar may be readily removed.

I claim—

1. The combination of a jar having a rounded bottom, a cover for the jar, a rod extending downward from the under side of the cover and a ladle on the lower end of the rod shaped to conform in a general way to the concavity of the bottom of the jar.

2. The combination of a jar, a cover for the jar, a dipper adapted to enter the jar, a connection between the cover and the dipper holding the dipping edge of the dipper always presented in a certain direction with relation to the cover and a mark or configuration on the upper surface of the cover to indicate the direction in which the dipping edge of the dipper is presented.

3. The combination of a jar, a cover for the jar, a rod extending below the cover, a dipper on the lower end of the rod with its dipping edge extended away therefrom and a handle above the cover rigidly connected with the rod and shaped to aid in lifting the dipper in a proper filling and emptying position.

4. An agitating and measuring device comprising a jar, an imperforated cover therefor, a rod attached to said cover and extending downwardly and rearwardly therefrom, a dipper on the end of the rod which presents its dipping edge downwardly when the cover is on, but which when the cover is moved to bring the back of the rod against the edge of the mouth of the jar, the dipper will assume a horizontal position adjacent the bottom of the jar, thereby agitating the contents in the bottom of the jar and measuring a desired quantity.

5. An agitating and measuring device comprising a jar, an imperforated cover therefor, a rod attached to said cover and extending downwardly and rearwardly therefrom, a dipper on the end of the rod which presents its dipping edge downwardly when the cover is on, but which when the cover is moved to bring the back of the rod against the edge of the mouth of the jar, the dipper will assume a horizontal position adjacent the bottom of the jar, thereby agitating the contents in the bottom of the jar and measuring the desired quantity, said dipper being so shaped that it fits in the bottom of the jar.

6. The combination with a jar having an opening, of an imperforated cover for said opening, a rod secured to the lower surface of the cover and extending obliquely therefrom, said rod terminating in a dipper, said dipper being shaped so that it fits in the bottom of the jar, its dipping edge being normally presented downwardly, the dipper being inclined to the rod at such an angle that when the back of the rod is against the side of the mouth of the jar the dipper may be made to assume an approximately horizontal position adjacent the bottom of the jar.

7. The combination of a jar having a wide mouth, a cover for the mouth of the jar, a rod attached to the cover and extended downward therefrom and a dipper on the lower end of the rod inclined to the rod at such an angle that when the rod is against a side of the mouth of the jar the dipper may be made to assume an approximately horizontal position adjacent the bottom of the jar, said dipper being so shaped that it fits in the bottom of the jar.

8. The combination of a jar having a wide mouth, a cover for the mouth of the jar, a rod attached to the cover and extended obliquely downward therefrom and a dipper on the lower end of the rod inclined to the rod at such an angle that the dipper may be made to assume an approximately horizontal position inside the jar, said dipper being so shaped that it fits in the bottom of the jar, its dipping edge being normally presented downwardly.

In testimony whereof I sign my name in the presence of two subscribing witnesses.

ROBERT FARIES.

Witnesses:

GEO. S. FOSTER,

E. P. IRVING.